Sept. 9, 1924.

W. C. CHRISTMAS

FAUCET

Filed Nov. 19, 1921

1,507,582

Inventor:

Willard C Christmas.

Patented Sept. 9, 1924.

1,507,582

UNITED STATES PATENT OFFICE.

WILLARD C. CHRISTMAS, OF BOONVILLE, INDIANA.

FAUCET.

Application filed November 19, 1921. Serial No. 516,492.

*To all whom it may concern:*

Be it known that I, WILLARD C. CHRISTMAS, a citizen of the United States, residing at Boonville, in the county of Warrick and State of Indiana, have invented certain new and useful Improvements in Faucets, of which the following is a specification.

This invention relates to self-closing faucets, and has for its object to provide an automatically spring closing faucet, to economically control the flow of water from a pipe line, and adapted for use with wash-basins, lavatories, kitchen-sinks, drain-boards and similar devices.

A further object of the invention is to eliminate the waste of water, due to negligence in operating the faucet, causing a constant leakage directly through the faucet, as is common in the disc-valve and similar faucets, due to improper or incomplete closing.

The invention mainly comprises the usual faucet body provided with a valve seat whose co-operating valve member is a ball mounted in a spring-urged stem, the ball being centered on its seat by a pivot ball.

Other features of invention will hereafter be described and claimed.

Referring to the drawings, in which like parts are similarly designated—

Figure 1:
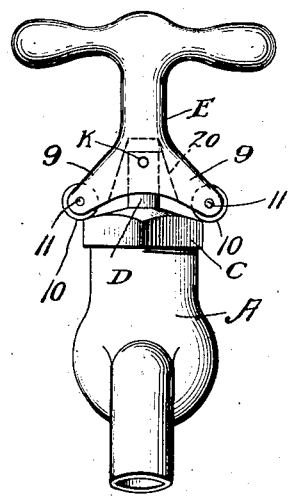
Figure 1 is a front elevation.
Figure 2:
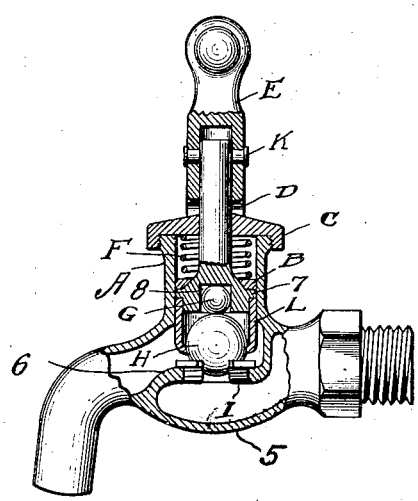
Fig. 2 is a side elevation, partly in section of a faucet constructed according to my invention.

Referring more particularly to Figs. 1 and 2, the usual faucet body 5 is provided with the customary partition 6 having a valve seat, and the cylinder extension A immediately opposite the seat.

The valve seat I is a threaded nipple screwed into the partition 6.

The valve stem D has at one end an enlarged portion 7 fitting cylinder A and carrying a ball cage L in which is confined a large or main valve-ball H, which in turn retains a smaller ball G in a recess 8 in the enlarged end 7 of the stem D.

The ball cage L is preferably of the same diameter as the internal diameter of the cylinder A and forms an extension of the surface of the enlarged portion 7 of the stem D, thereby forming a longer bearing surface in the cylinder.

The stem D is provided with a packing washer B retained by the enlarged end portion 7 of the stem D and fitting within the cylinder A.

A coil spring F in the cylinder A surrounds the stem D and is included between the packing washer B and a bonnet cap C for the cylinder A, and perforated, as usual, for the passage of the stem D. The spring will hold the washer securely in place. The bonnet cap is hexagonal externally, as usual, and has a conical upper surface.

The upper end of the stem D enters a bore or recess 20 in the handle E for a rocking fit and is secured therein by a transverse pin K. The handle E has two lateral projections 9 in which are mounted rollers 10 on pins 11, so that when the handle is in the position shown in Fig. 1, these rollers rest on the outer portion of the conical surface of the bonnet cap C and the valve rests on its seat and the stem is raised to lift the valve-ball H from its seat when the handle is rocked.

When tilted or rocked one of the rollers 10 rides up the conical surface of the bonnet cap, which acts as a lifting surface and unseats the ball H, and when the handle is released allows the spring F to urge the spindle D to seat the ball H. The smaller or pivot ball G directly contacting with the valve-ball H rolls the latter into alinement on its seat I, thus perfectly seating the valve-ball.

Figure 3:
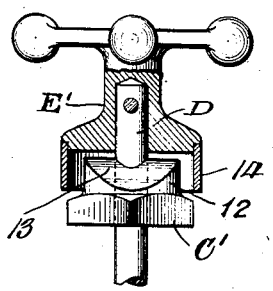
Figs. 3 and 4 are elevations, partly in section, at right angles to each other, illustrating a modification of the stem lifting means.
Figure 4:
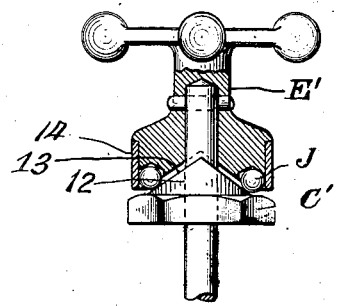

In the modification shown in Figs. 3 and 4, the bonnet cap C' is provided on its upper surface with a short cylindrical portion 12 having two bevelled lifting faces 13, through whose meeting edges the stem D passes.

The handle E' is provided with anti-friction balls J, herein shown as one for each bevelled lifting face 13, which are retained in the recesses in the handle by an apron 14 that surrounds the cylindrical portion 12 of the cap.

By turning the handle E' the balls J ride up the inclined faces 13, thus forcing the handle and its attached stem upward. Upon release of the handle the spring F will automatically seat the valve H.

I claim—

1. In a faucet, the combination with the body thereof and the valve seat therein; of a valve stem, a caged valve-ball on said stem and a pivot ball between the valve ball and stem.

2. In a faucet, the combination with the faucet body having a cylinder and an alined valve seat; of a valve spindle having an enlarged end fitting said cylinder and provided with a ball receiving recess, a pivot ball in said recess, a larger valve ball, and a cage secured to said enlarged stem portion retaining both balls.

3. In a faucet, the combination with a faucet body, a partition therein and a cylinder thereon opposite said partition; of a threaded nipple in said partition forming a valve seat, a valve stem having an enlarged end in said cylinder, a ball cage on said stem, a ball-valve in said cage, a pivot ball between the valve ball and enlarged end of the stem, a bonnet for said cylinder, a spring in the cylinder between the enlarged stem portion and bonnet, a handle secured to the stem and means on the bonnet co-operating with the handle to raise the handle and stem against the stress of said spring to unseat the valve-ball.

4. In a faucet the combination with a faucet body having a partition and a cylinder, and a valve seat in said partition; of a bonnet, a stem projecting through the bonnet having an enlarged end fitting said cylinder, a ball cage secured to said enlarged end and of the same diameter as said end, and a valve ball co-operating with the seat and held by said cage.

WILLARD C. CHRISTMAS.